(12) United States Patent
Larus et al.

(10) Patent No.: US 6,360,361 B1
(45) Date of Patent: Mar. 19, 2002

(54) FIELD REORDERING TO OPTIMIZE CACHE UTILIZATION

(75) Inventors: James R. Larus, Mercer Island; Robert Davidson, Bellevue, both of WA (US); Trishul M. Chilimbi, Madison, WI (US)

(73) Assignee: Microsoft Corporation, Redmond, WA (US)

(*) Notice: Subject to any disclaimer, the term of this patent is extended or adjusted under 35 U.S.C. 154(b) by 0 days.

(21) Appl. No.: 09/270,124

(22) Filed: Mar. 15, 1999

(51) Int. Cl.$^7$ ................................................. G06F 9/45
(52) U.S. Cl. .................... 717/9; 717/4; 717/5; 714/35; 714/45
(58) Field of Search .............................. 717/9, 11, 5, 4; 711/163, 133; 714/35, 47, 45

(56) References Cited

U.S. PATENT DOCUMENTS

| | | | | |
|---|---|---|---|---|
| 5,212,794 A | * | 5/1993 | Pettis et al. ..................... | 717/9 |
| 5,613,118 A | * | 3/1997 | Heisch et al. ................... | 717/9 |
| 5,659,752 A | * | 8/1997 | Heisch et al. ................... | 717/4 |
| 5,752,038 A | * | 5/1998 | Blake et al. ..................... | 717/9 |
| 5,774,724 A | * | 6/1998 | Heisch ............................ | 717/4 |
| 5,889,999 A | * | 3/1999 | Breternitz, Jr. et al. ......... | 717/9 |
| 5,953,531 A | * | 9/1999 | Megiddo et al. ................ | 717/9 |
| 6,006,033 A | * | 12/1999 | Heisch ............................ | 717/9 |
| 6,026,413 A | * | 2/2000 | Challenger et al. ......... | 707/202 |
| 6,058,266 A | * | 5/2000 | Megiddo et al. ................ | 717/9 |
| 6,175,957 B1 | * | 1/2001 | Ju et al. .......................... | 717/9 |
| 6,216,212 B1 | * | 4/2001 | Challenger et al. ......... | 711/163 |
| 6,226,408 B1 | * | 5/2001 | Sirosh .......................... | 382/224 |
| 6,233,678 B1 | * | 5/2001 | Bala ............................. | 712/240 |

OTHER PUBLICATIONS

TITLE: Profile guided code positioning, Pettis et al, ACM Sigplan, Jun. 1990.*
TITLE: Optimally Profiling and Tracing Programs, Ball et al, ACM, Jan., 1992.*
TITLE: Cache–conscious structure definition, Chilimbi, ACM, May, 1999.*
U.S. Patent Application Serial No. 09/024,248 entitled Optimized Logging of Data Elements to a Data Storage Device.
Fraser, C.W., et al., "A Retargetable C. Compiler: Design and Implementation", Benjamin/Cummings, Redwood City, California, (1995).

* cited by examiner

Primary Examiner—Kakali Chaki
Assistant Examiner—Chameli C. Das
(74) Attorney, Agent, or Firm—Merchant & Gould (57) ABSTRACT

Fields which are individually addressable data elements in data structures are reordered to improve the efficiency of cache line access. Temporal data regarding the referencing of such fields is obtained, and a tool is used to construct a field affinity graph of temporal access affinities between the fields. Nodes in the graph represent fields, and edges between the nodes are weighted to indicate field affinity. A first pass greedy algorithm attempts to combine high affinity fields in the same cache line or block. Constraints are used to reject invalid combinations of fields. The constraints may be provided by program analysis, programmer, or actual dynamically generated.

22 Claims, 7 Drawing Sheets

FIG. 1

```
Struct: A{
        int a;
        char [64] b;
        char [8] c;
};
Struct: B{
        int x;
        int y;
```

```
for each structure type
{
    for each instance of this type
    {
        combine field access information for multiple
        occurrences of the same field;

// Build a field affinity graph for this instance
        for each pair of instance fields
        {
            compute field affinity edge weight;
        }
    }

//Combine instance field affinity graphs to create a structure
    // field affinity graph
    for each pair of structure fields
    {
        find all structure instances for which this pair of fields
            has an affinity edge and compute a weighted affinity;
    }
}
```

FIELD REORDERING TO OPTIMIZE CACHE UTILIZATION

REFERENCE TO RELATED APPLICATIONS

This application is related to co-pending applications having application Ser. No. 09/268/204—Data Structure Partitioning Combined with Garbage Collection to Optimize Cache Utilization and application Ser. No. 09/270,125—Data Structure Partitioning to Optimize Cache Utilization assigned to the same assignee as the present application, filed on the same day herewith and hereby incorporated by reference. U.S. patent application Ser. No. 09/024,248 for OPTIMIZED LOGGING OF DATA ELEMENTS TO A DATA STORAGE DEVICE is hereby incorporated by reference, at least with respect to its teaching of the logging of access of data structure elements. U.S. Pat. No. 5,752,038 for METHOD AND SYSTEM FOR DETERMINING AN OPTIMAL PLACEMENT ORDER FOR CODE PORTIONS WITHIN A MODULE is also hereby incorporated by reference for its teaching of the use of bit vectors which contain multiple bits representing unique time intervals.

FIELD OF THE INVENTION

This invention relates generally to the field of computer memory management and in particular to optimizing cache utilization by modifying data structures.

COPYRIGHT NOTICE/PERMISSION

A portion of the disclosure of this patent document contains material which is subject to copyright protection. The copyright owner has no objection to the facsimile reproduction by anyone of the patent document or the patent disclosure as it appears in the Patent and Trademark Office patent file or records, but otherwise reserves all copyright rights whatsoever. The following notice applies to the software and data as described below and in the drawing hereto: Copyright© 1998, Microsoft Corporation, All Rights Reserved.

BACKGROUND

Users are demanding increased performance of their applications running on their computers. Computer hardware, including central processing units (CPUs), are becoming increasingly faster. However, their performance is limited by the speed at which data is available to be processed. There are several devices that provide the data. Disk drives, compact disks and other secondary storage devices can store great amounts of data cost effectively, but have great delays in providing data because the physical media on which the data is stored must be moved to a position where it can be read. This type of physical motion requires great amounts of time when compared to the cycle times of processors. The next fastest common data storage device is referred to as random access memory (RAM) which is much faster. However, processor speeds have increased, and even RAM cannot provide data fast enough to keep up with them.

In a typical computer, Level 1 (L1) and Level 2 (L2) cache memories are similar to RAM, but are even faster, and are physically close to a processor to provide data at very high rate. The cache memory is typically divided into 32, 64, or 128 byte cache lines. The size of a cache line normally corresponds to a common unit of data retrieved from memory. When data required by a processor is not available in L1 cache, a cache line fault occurs and the data must be loaded from lower speed L2 cache memory, or relatively slow RAM. The application is often effectively stalled during the loading of this data, and until such time as the data is available to the CPU. By decreasing the number of cache faults, an application will run faster. There is a need to reduce the number of cache line faults and provide data to processors even faster to keep applications from waiting.

Computer applications utilize data structures which are made up of multiple fields. The order of the fields are usually defined at the time that an application is written by a programmer in accordance with the logic flow of the application. However, during normal operation of an application, fields may be accessed in unanticipated order. This unanticipated use of the fields by applications can lead to inefficient utilization of the cache lines including unnecessary cache misses. Since there are a limited number of cache lines available for use by an application, it is important to use them efficiently. The limited number of cache lines results in different data being mapped to the same cache line, resulting in that cache line being written over. If both sets of data being mapped to the same location are required by the application at about the same time, time is spent obtaining the data from slower storage to replace the data in the cache line each time the other set of data mapping to the same line is needed. Waiting for the data from slower storage adversely affects performance.

The first step in optimizing an application is to model the usage patterns of data elements by the application. To accomplish this, the application being optimized is executed and used in a typical manner, with data being recorded that tracks the order in which the data elements are accessed. The problem remaining is to determine how to group the data elements so that the most commonly accessed elements in relation to each other will end up on the same cache line. The prior application incorporated by reference uses weighted linear equations on various different combinations of elements to determine which combination appears to be optimal. This method can require significant computational resources. There is a need for a more efficient way to determine which data elements should be defined adjacent to each other to minimize cache misses. There is a need for a better way to manage the cache lines so that data commonly needed by applications is available with a minimal amount of cache line misses.

SUMMARY OF THE INVENTION

Fields, which are individually addressable data elements in data structures, are reordered to improve the efficiency of cache line access for a program. Temporal data regarding the referencing of such fields is obtained, and a tool is used to construct a field affinity graph of temporal access affinities between the fields. Nodes in the graph represent fields, and edges between the nodes are weighted to indicate field affinity. A first pass greedy algorithm combines high affinity fields in the same cache line or block. This provides a recommended reordering or layout of the fields that results in increased cache block utilization and reducing the number of cache blocks active during execution of programs.

The edges of the affinity graph are weighted by a measure of how many times during a predetermined period of running the program two nodes or data elements are accessed. When reordering fields, the greedy algorithm starts with the highest weighted edge and attempts to combine the two nodes of the edge into one cache line. If there is insufficient room in the cache line, the next highest weighted edge is processed to attempt to combine its two nodes. By repeating the process for successively less heavily weighted edges, fields are reordered in a manner that improves cache line utilization.

In one aspect of the invention, constraints imposed by the manner in which fields are originally defined are used by the greedy algorithm to ensure that particular orders of the fields are not modified, or are pointed out to a programmer. A suggested reordering of the fields is provided to programmers to allow them to modify definitions of variables and data structures in their programs to run more efficiently. A further aspect of the invention provides for dynamically reordering the fields and testing the program to ensure that no constraints were violated. Fields that were involved in an error may then be constrained during an iterative run through the layout process. Further aspects include the ability to perform program analysis and predict the benefits of field reordering. The analysis can be used to improve the suggestions to the programmers, or improve the modification of programs to ensure better testing.

DETAILED DESCRIPTION

In the following detailed description of exemplary embodiments of the invention, reference is made to the accompanying drawings which form a part hereof, and in which is shown by way of illustration specific exemplary embodiments in which the invention may be practiced. These embodiments are described in sufficient detail to enable those skilled in the art to practice the invention, and it is to be understood that other embodiments may be utilized and that logical, mechanical, electrical and other changes may be made without departing from the spirit or scope of the present invention. The following detailed description is, therefore, not to be taken in a limiting sense, and the scope of the present invention is defined only by the appended claims.

The detailed description is divided into multiple sections. A first section describes the operation of a computer system which implements the current invention of field reordering. This is followed by a description of a tool called bbcache, which creates an affinity graph showing the affinity of individually addressable data elements. The ability of the tool to then suggest a reordering of the elements to improve cache performance is described, followed by a description of dynamically modifying the application in accordance with the suggested reordering, and then running the application to generate constraints for using the tool again to suggest reordering of the data elements. This is followed by a conclusion which describes some potential benefits and describes further alternative embodiments.

Hardware and Operating Environment

Figure 1:
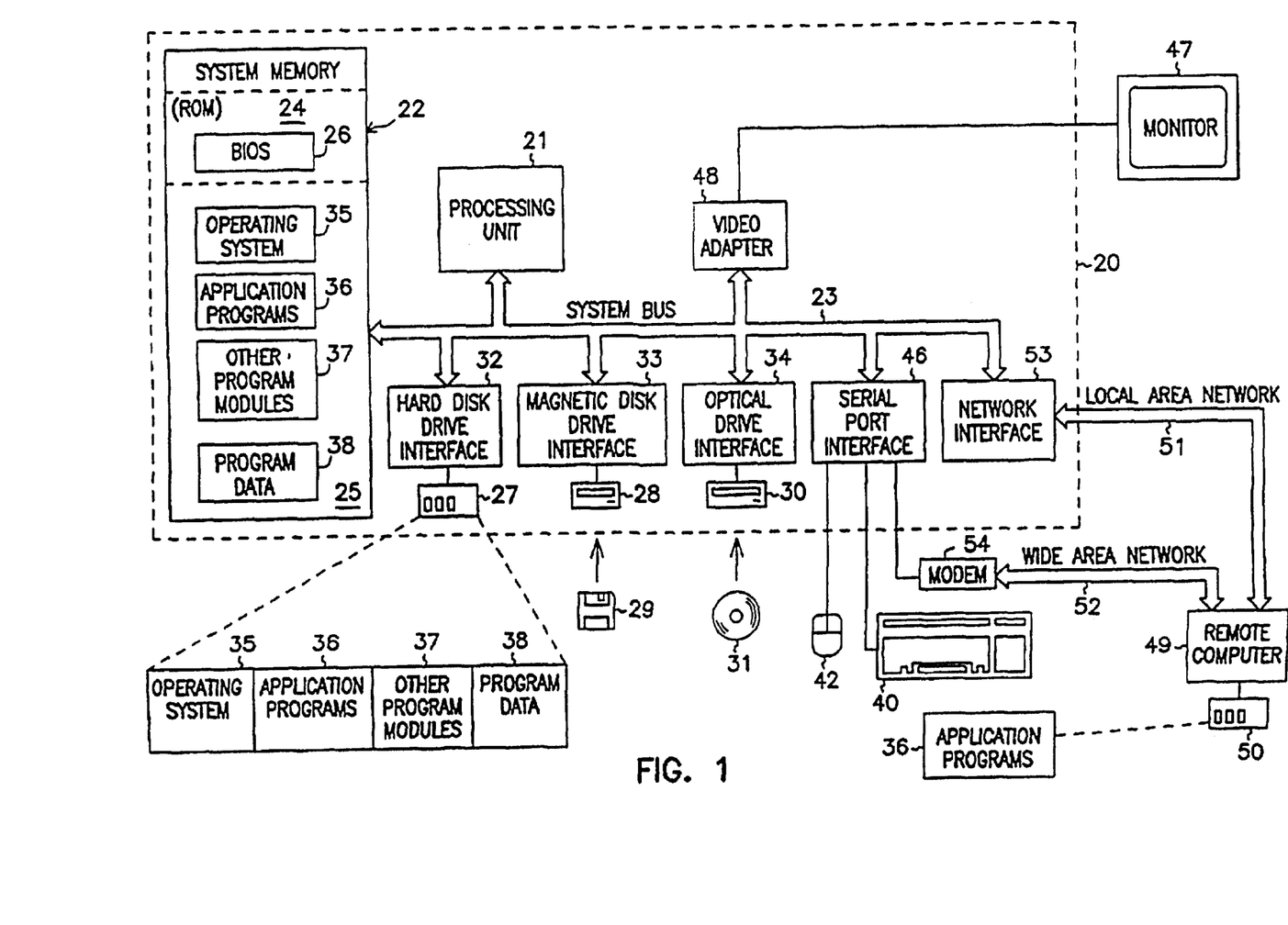
FIG. 1 is a block diagram of a computer system on which the present invention may be implemented.

FIG. 1 provides a brief, general description of a suitable computing environment in which the invention may be implemented. The invention will hereinafter be described in the general context of computer-executable program modules containing instructions executed by a personal computer (PC). Program modules include routines, programs, objects, components, data structures, etc. that perform particular tasks or implement particular abstract data types. Those skilled in the art will appreciate that the invention may be practiced with other computer-system configurations, including hand-held devices, multiprocessor systems, microprocessor-based programmable consumer electronics, network PCs, minicomputers, mainframe computers, and the like which have multimedia capabilities. The invention may also be practiced in distributed computing environments where tasks are performed by remote processing devices linked through a communications network. In a distributed computing environment, program modules may be located in both local and remote memory storage devices.

FIG. 1 shows a general-purpose computing device in the form of a conventional personal computer 20, which includes processing unit 21, system memory 22, and system bus 23 that couples the system memory and other system components to processing unit 21. System bus 23 may be any of several types, including a memory bus or memory controller, a peripheral bus, and a local bus, and may use any of a variety of bus structures. System memory 22 includes read-only memory (ROM) 24 and random-access memory (RAM) 25. A basic input/output system (BIOS) 26, stored in ROM 24, contains the basic routines that transfer information between components of personal computer 20. BIOS 26 also contains start-up routines for the system. Personal computer 20 further includes hard disk drive 27 for reading from and writing to a hard disk (not shown), magnetic disk drive 28 for reading from and writing to a removable magnetic disk 29, and optical disk drive 30 for reading from and writing to a removable optical disk 31 such as a CD-ROM or other optical medium. Hard disk drive 27, magnetic disk drive 28, and optical disk drive 30 are connected to system bus 23 by a hard-disk drive interface 32, a magnetic-disk drive interface 33, and an optical-drive interface 34, respectively. The drives and their associated computer-readable media provide nonvolatile storage of computer-readable instructions, data structures, program modules and other data for personal computer 20. Although the exemplary environment described herein employs a hard disk, a removable magnetic disk 29 and a removable optical disk 31, those skilled in the art will appreciate that other types of computer-readable media which can store data accessible by a computer may also be used in the exemplary operating environment. Such media may include magnetic cassettes, flash-memory cards, digital versatile disks, Bernoulli cartridges, RAMs, ROMs, and the like.

Program modules may be stored on the hard disk, magnetic disk 29, optical disk 31, ROM 24 and RAM 25. Program modules may include operating system 35, one or more application programs 36, other program modules 37, and program data 38. A user may enter commands and information into personal computer 20 through input devices such as a keyboard 40 and a pointing device 42. Other input devices (not shown) may include a microphone, joystick, game pad, satellite dish, scanner, or the like. These and other input devices are often connected to the processing unit 21 through a serial-port interface 46 coupled to system bus 23;

but they may be connected through other interfaces not shown in FIG. 1, such as a parallel port, a game port, or a universal serial bus (USB). A monitor 47 or other display device also connects to system bus 23 via an interface such as a video adapter 48. In addition to the monitor, personal computers typically include other peripheral output devices (not shown) such as speakers and printers.

Personal computer 20 may operate in a networked environment using logical connections to one or more remote computers such as remote computer 49. Remote computer 49 may be another personal computer, a server, a router, a network PC, a peer device, or other common network node. It typically includes many or all of the components described above in connection with personal computer 20; however, only a storage device 50 is illustrated in FIG. 1. The logical connections depicted in FIG. 1 include local-area network (LAN) 51 and a wide-area network (WAN) 52. Such networking environments are commonplace in offices, enterprise-wide computer networks, intranets and the Internet.

When placed in a LAN networking environment, PC 20 connects to local network 51 through a network interface or adapter 53. When used in a WAN networking environment such as the Internet, PC 20 typically includes modem 54 or other means for establishing communications over network 52. Modem 54 may be internal or external to PC 20, and connects to system bus 23 via serial-port interface 46. In a networked environment, program modules, such as those comprising Microsoft® Word which are depicted as residing within 20 or portions thereof may be stored in remote storage device 50. Of course, the network connections shown are illustrative, and other means of establishing a communications link between the computers may be substituted.

Software may be designed using many different methods, including object oriented programming methods. C++ and Java are two examples of common object oriented computer programming languages that provtide functionality associated with object oriented programming. Object oriented programming methods provide a means to encapsulate data members (variables) and member functions (methods) that operate on that data into a single entity called a class. Object oriented programming methods also provide a means to create new classes based on existing classes.

An object is an instance of a class. The data members of an object are attributes that are stored inside the computer memory, and the methods are executable computer code that act upon this data, along with potentially providing other services. The notion of an object is exploited in the present invention in that certain aspects of the invention are implemented as objects in one embodiment.

An interface is a group of related functions that are organized into a named unit. Each interface may be uniquely identified by some identifier. Interfaces have no instantiation, that is, an interface is a definition only without the executable code needed to implement the methods which are specified by the interface. An object may support an interface by providing executable code for the methods specified by the interface. The executable code supplied by the object must comply with the definitions specified by the interface. The object may also provide additional methods. Those skilled in the art will recognize that interfaces are not limited to use in or by an object oriented programming environment.

Field Reordering

Figure 2:
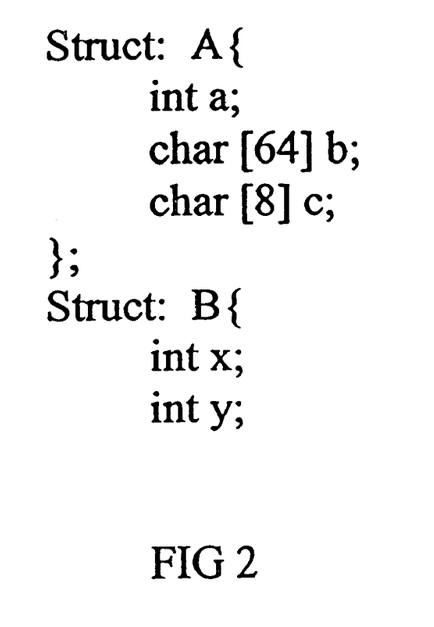
FIG. 2 is a pseudo code representation of two data structures showing their size.

In FIG. 2, data structures A and B are defined as shown in the pseudo code for a program written in a language such as C which includes individually addressable data elements. In this case, the elements in structure A are a, b and c, where a is a four byte integer, b is a 64 byte text string and c is an eight byte floating point number. Each of these data elements is individually addressable in common pointer based languages. Other languages have similar individually addressable data elements, such as data members in C++ or Java. Fields in relational databases may also be thought of as individually addressable data elements. These data structures are a simple representation of potential data structures described in a computer program application for illustration of the use of the bbcache tool.

Many times an operation by an application on one field will contemporaneously or immediately be followed by an operation on another field. In other words, the operations occur within a short amount of time, which is relative to the speed of the processor, such as 100 milliseconds for current processor speeds of about 300 to 500 megahertz. This results in a high temporal access affinity for those two elements. It does not matter which element is accessed first. By counting the number of such accesses over a selected period of time while actually running the application, and storing such accesses in a trace file, the trace file ends up containing temporal data concerning structure field accesses as well as field access execution counts. This file may be created using the methods described in the above co-pending U.S. patent application Ser. No. 09/026,298 for OPTIMIZED LOGGING OF DATA ELEMENTS TO A DATA STORAGE DEVICE, which is assigned to the same assignee as the present application. Further information regarding obtaining temporal data can be found in U.S. Pat. No. 5,752,038 which is also hereby incorporated by reference for its teaching of the use of bit vectors which contain multiple bits representing unique time intervals. Memory references to data elements cause a bit vector to be located, and the bit for that time interval is set to 1. By later comparing the bit vectors, it is a straight forward exercise to derive desired temporal affinities.

A trace may also be used to collect temporally correlated reference data if desired by tracing all memory references and using a sliding time window to identify references to each other that are within the selected time window. As above, 100 milliseconds is used in one embodiment. Other embodiments may use intervals ranging from 50 to 1000 milliseconds as most structures do not appear to be very sensitive to the exact interval used to define contemporaneous access. Of course, these time intervals will scale with processor speeds as they increase. Static program analysis may also be used to determine which fields may be contemporaneously accessed. Such analysis can range from a programmer familiar with the program making educated estimates, or from tools written to analyze program data structure usage.

Figure 3:
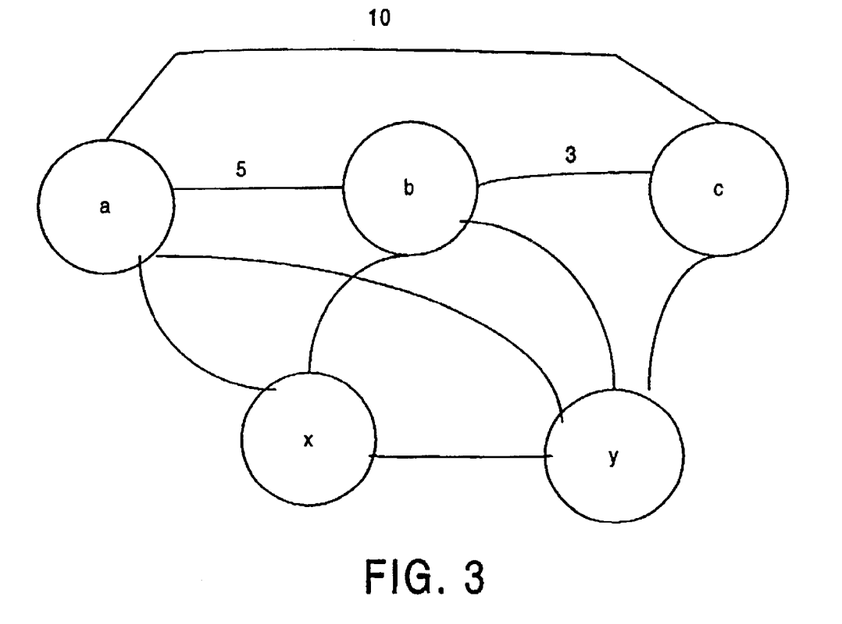
FIG. 3 is an affinity graph showing temporal affinity for elements in the data structures of FIG. 2.

A field affinity graph is constructed by bbcache as shown in FIG. 3. Each of the data elements defined in FIG. 2 are shown as nodes in FIG. 3 with arcs or edges drawn between them. The nodes are representative of all instances of the data structure. The edges are weighted to indicate field affinity, which is a function of temporal information and execution frequency with each structure access point as derived from the trace file. To derive the field affinity, the trace file is read, and a structure access database is built as a hash table on structure names. Each hash table entry represents a structure type and contains a list of structure instances. Every structure instance contains a list of fields that were accessed through that instance, and each field in turn contains information about each source location where it is accessed. Alternatives for the hash table include any type of data structure that maps from a structure name to the list, including relational databases, flat files and search trees.

To construct the field affinity graph, each structure instance is used to construct an instance field affinity graph, where nodes represent fields and edges between nodes are weighted to indicate field affinity. Multiple individual structure affinity graphs (at least one for each instance) are then combined to produce a single structure affinity graph as shown in FIG. 3. The nodes in the resulting field affinity graph may also be determined without the use of a graph for each instance, simply by directly mapping the field references through each instance into the final field affinity graph.

One method of determining the affinity for each pair of fields within the structure comprises counting the number of time intervals in te trace where both fields were referenced. An example is where a trance is 20 time intervals long, and field1 is referenced in time intervals 0,1,2,3,4,5,6,7,8,9,14, 15. Field2 is referenced in time intervals 4,5,6,7,8,9,10,11, 12,13,14,15. The resulting affinity of field1×filed 2 is 8, the number of common time intervals (4,5,6,7,8,9,14,15). This is computed for each instance, and then each instance is summed to create the structure affinity weights.

It should be noted that fields a, b and c all have edges between them, and in addition, they have edges between data elements x and y from data structure B. However, the edges between data elements from different structures may be effectively ignored in one embodiment due to the low likelihood of relevant affinity and due to reordering limitations inherent in some languages. In a further embodiment, edges between data elements in different data structures are not even put in the model, so no time is wasted determining their affinity.

Figure 4:
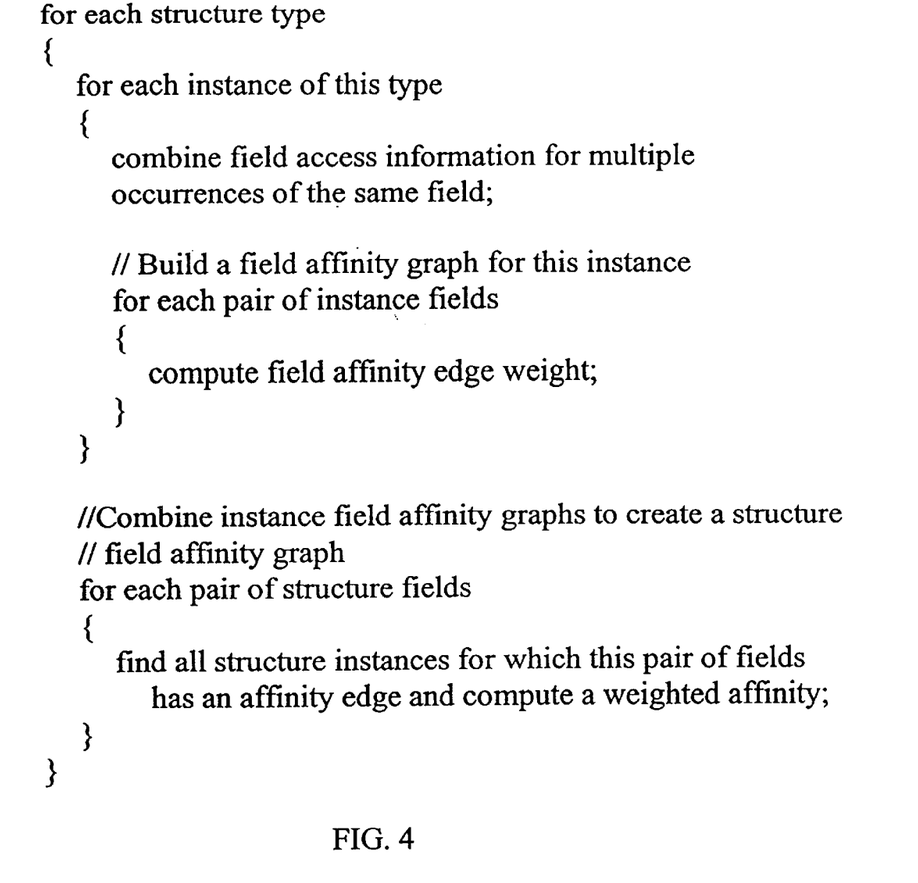
FIG. 4 is a pseudo code representation showing the determination of weighted temporal affinity values to pairs of elements.

A pseudo code representation in FIG. 4 shows how the affinity edge weight is determined by bbcache for a structure field affinity graph. For each structure type, and for each instance of the structure type, field access information for multiple occurrences of the same filed are first combined. The field affinity graph for each instance of the structure type is built for each par of instance fields. An affinity edge weight for such pair is then computed. This results in multiple instance filed affinity graphs as each instance of the structure type is processed. The resulting instance affinity fields are then combined to create a structure filed affinity graph for each pair of structure fields. A weighted affinity is then computed for all structure instances for which this pair of fields has an affinity edge. The process is repeated with each structure type, resulting in the generation of the weighted affinity graph where edge weights are proportional to the frequency of contemporaneous access.

The highest affinity seen in FIG. 3 is between elements a and c, which have an affinity of ten. Elements a and b come in next with an affinity of five, with elements b and c having an affinity of three. Intuitively, this would indicate that an attempt to define elements a and c near each other should be made, and in addition, include element b with a. However, due to the size of elements a and b in relation to the size of a cache line in one embodiment, their combined size (4 bytes+64 bytes) would exceed the 64 byte size of a typical cache line.

Since structure alignment with respect to cache block boundaries is usually determined at run time (unless selected pointers are suitably manipulated), inherent locality is increased by placing fields with high temporal affinity near each other. By placing such fields near each other, they are likely to reside in the same cache block. Further embodiments may track exactly how fields are written to cache blocks, and optimally pack fields exactly into cache blocks. If alignment (natural boundary) constraints would force a gap in the layout that alternative high temporal affinity fields are unable to occupy, an attempt is made to fill these with structure fields that were not accessed in the profiling scenario.

A notion of configuration locality is used to explain bbcache's algorithm. Configuration locality attempts to capture a layout's inherent locality. The first step is to compute a layout affinity for each field, which is the sum of its weighted affinities with neighboring fields in the layout up to a predefined horizon (presumably equivalent to the cache block size) on either side. If field $f_i$ is surrounded by fields $f_l, \ldots, f_n$, in the layout, then its layout affinity is:

$$\text{Field layout affinity}(f_i) = wt(f_l, f_i)*aff(f_l, f_i) + \ldots + wt(f_n, f_i)*aff(f_n, f_i)$$

The weights, wt, correspond to the distance between the fields—the number of bytes separating the start of the fields—and are a measure of the probability that the fields will end up in the same cache block. The weighting factor used is:

$$wt(f_i, f_j) = ((\text{cache\_block\_size} - \text{dist}(f_i, f_j))/\text{cache\_block\_size})$$

Figure 5:
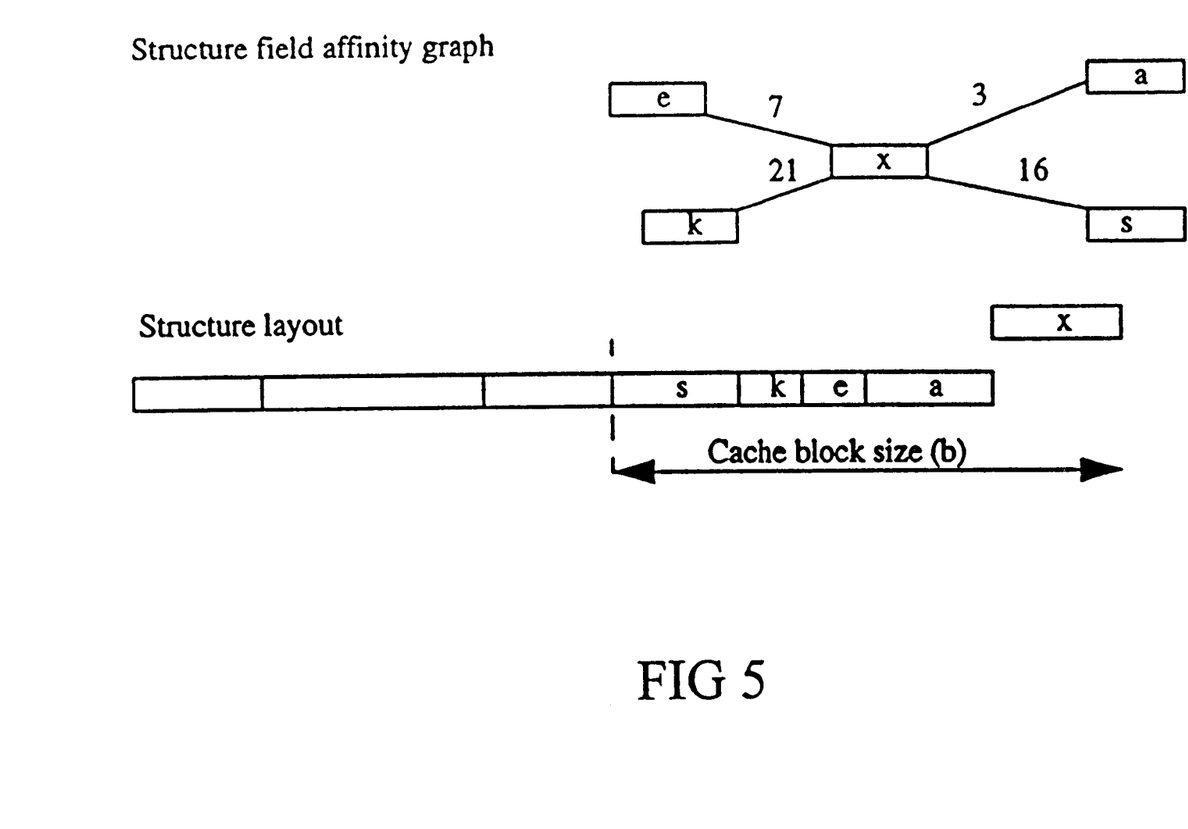
FIG. 5 is a block diagram showing the structure layout when adding a new element.

A structure's configuration locality is the sum of its field layout affinities. FIG. 5 illustrates the process of computing the increase in configuration locality from adding field x to an existing layout.

Figure 6:
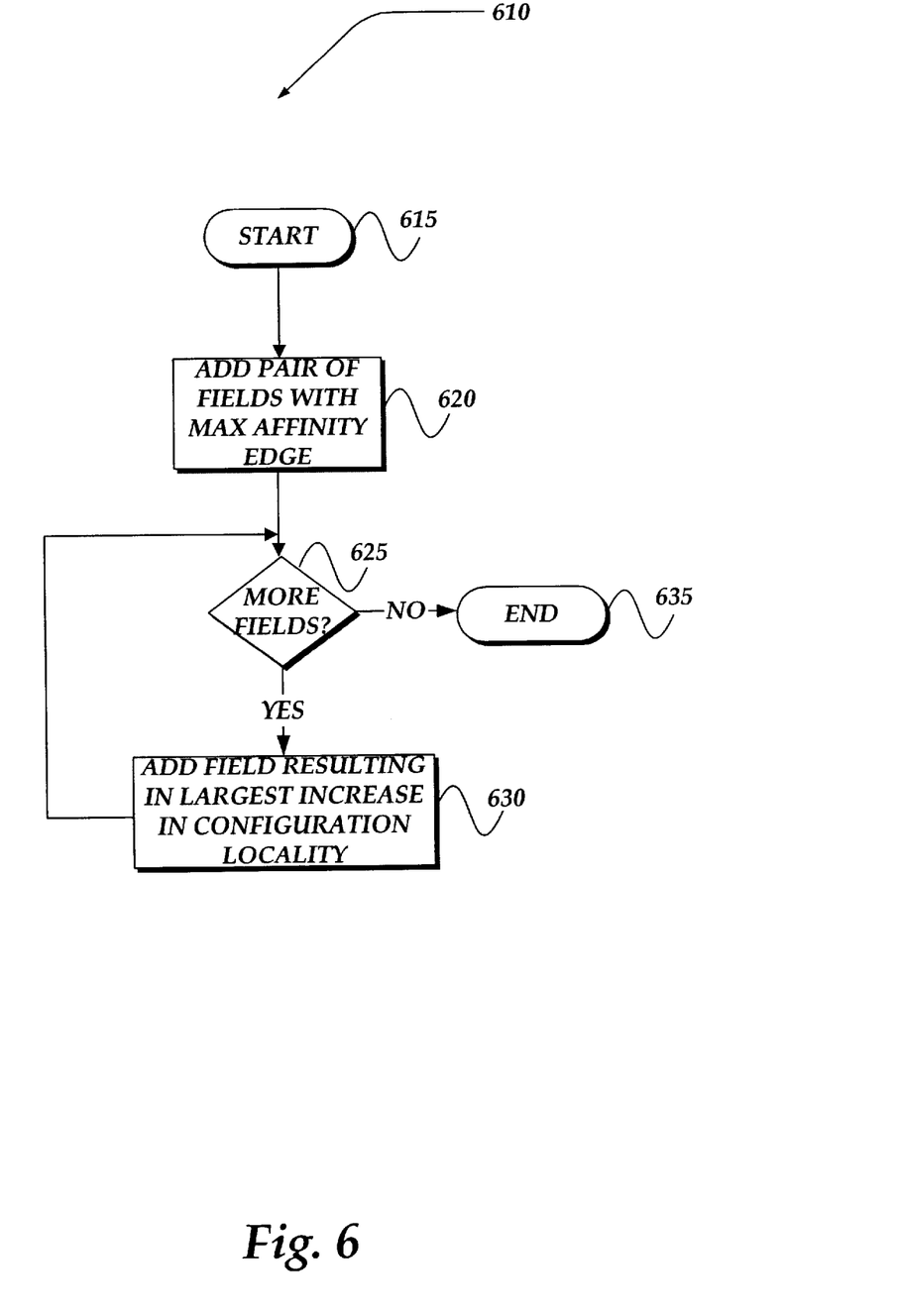
FIG. 6 is a flow chart showing the adding of fields using a first pass greedy algorithm.

To produce a structure field order recommendation from a structure field affinity graph, field layout is optimized for inherent locality by placing fields that show strong affinity close to each other, rather than trying to pack fields exactly into cache blocks. bbcache uses a greedy algorithm indicated generally at 610 in FIG. 6 to produce structure field order recommendations from a structure field affinity graph. It starts 615 by adding the pair of fields, connected by the maximum affinity edge in the structure field affinity graph, to the layout at block 620. Then, if there are more fields that have not been added as indicated at 625, a single field is appended to the existing layout at 630. The field selected is the one that increases configuration locality by the largest amount at that point in the computation. This process is repeated until all structure fields are laid out at 635.

After the highest affinity fields have been added, the order in which remaining fields are added has little impact on performance because the remaining fields are infrequently referenced. As such, they may be added in any order if desired. Most performance gains are achieved during the assignments of the first few layouts.

While the best way to evaluate a structure field ordering is to measure its impact on performance, this entails a tedious cycle of editing, recompiling, and rerunning the application. A quality metric for structure field orderings can help compare a recommended layout against the original layout and help evaluate alternative layouts, without rerunning the application. This is especially useful when field layout constraints prevent directly following the field ordering recommendations.

bbcache provides two metrics to evaluate structure field orders, as well as a query facility to compare alternative layouts. The first is a metric of the average number of structure cache blocks active during an application's execution (i.e., a measure of a structure's cache block working set or cache pressure). This metric is computed by combining temporal information for field accesses with a structure's field order to determine active cache blocks. A program's execution is divided into temporal intervals of 100 ms each. This metric assumes that structures start on cache block boundaries, and uses the field order (and field sizes) to assign fields to cache blocks. If any of the fields in a cache block are accessed during an execution interval, that block is considered to be active in that interval. Let n represent the total number of program execution intervals, and $b_1, \ldots, b_n$ the number of active structure cache blocks in each of these intervals. Then a structure's cache block pressure is:

Cache block pressure=$\Sigma(b_1, \ldots, b_n)/n$

The second metric is a locality metric that measures a structure's average cache block utilization. Let $f_{ij}$ represent the fraction of cache block j accessed (determined by accessed field sizes relative to the cache block size) in program execution interval i, then:

Cache block utilization=$\Sigma(f_{11}, \ldots, f_{nbn})/\Sigma(b_1, \ldots, b_n)$ A layout configuration affinity is then computed by calculating for each field in the layout, its affinity with surrounding fields, until a predefined horizon (presumably equivalent to the cache block size) on either side. In addition, the affinity of a field to neighboring fields is weighted by the distance between the two fields, where the weight is a measure of the probability that the two fields will end up in the same cache block. A layout configuration affinity is then the sum of these field layout affinities for all fields in the layout. The layout configuration affinity can be used to determine whether one particular layout, which comprises all the layout blocks, is likely to be better than the original layout, or other layouts which have been generated.

Further constraint based checks may be performed during each check of size in FIG. 6. These checks involve determining if any reordering of fields violates constraints that are either imposed by the language that the application is written in, by the logic of the program itself or by metadata either created by the programmer to identify constraints, or generated by program analysis. Such metadata identifies constraints such as those related to elements being passed outside the program, those having pointers to them or references to them. Further, the passing of elements to dynamic linked libraries or anything outside its context might be identified as a constraint in the metadate. Many other such constraints may also be identified resulting from data elements going to disk or being passed to the operating system or network. Further constraints may be generated by having elements involved in structures that are aliased to each other. If viewed as two separate structures, an operation on one may not be reflected on another structure. Further, programmers can generate an address at random and treat it as any type of data structure desired, which can result in further constraints. These checks occur at block 630 in FIG. 6.

While one result of the invention is a recommended layout of the fields defined in an application, a further embodiment actually makes the recommended changes and then run the resulting application. By monitoring the points at which the application fails, if any, further constraints may be imposed on combinations of elements at block 630. This provides the ability to dynamically modify layouts of actual applications.

In one embodiment, while running the application with dynamically reorganized fields, a data element which was involved in an error in running the application is tracked. A constraint on reordering this element may then be associated with that data element during a second run through the layout process. This will result in a new layout, which again may be implemented dynamically and the application run again. By iteratively running through the layout and testing process to generate real time constraints, many layout configurations may be generated, without the programmer needing to become involved with the process.

A further embodiment involves statically analyzing the program or application to detect these constraints and to avoid reordering constrained structures.

Figure 7:
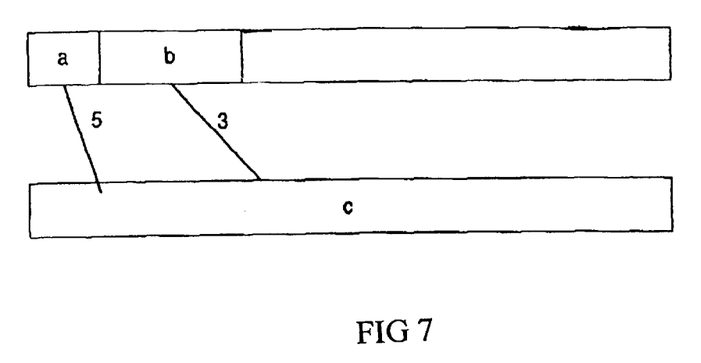
FIG. 7 is a block diagram showing one example field layout.

FIG. 7 is a block representation of the resulting recommended layout of two cache blocks that relate to the simplified data structure A defined in FIG. 2. As can be seen, elements a and c, having a weight of 10 are laid out adjacently to increase the likelihood that they will be combined on the first cache block. Element b, which has comparative weights of 5 and 3, for a total of 8, ended up on the second cache block. The weight of the edges that go between cache block has been minimized by the process above.

While dynamic reordering of fields can be performed, one desired way to obtain a useful, concrete and tangible result is to provide layout suggestions to the programmer and let them determine what is constrained, or try it and see if it breaks. These suggestions may be provided in an ordered list of data elements which should be defined together, or in one of many graphical representations such as that shown in FIG. 7. They may be provided in hardcopy, or displayed on a computer display. Further, as discussed above, changes in element definitions may actually be made directly in the application. Further embodiments also include actual suggested definition modifications.

Conclusion

Fields which are individually addressable data elements in data structures are reordered based on a field affinity graph of temporal access for a pointer based program. A first pass greedy algorithm co-locates high affinity fields in the same cache line or block to increase cache block utilization and reduce the number of cache blocks active during execution of programs. Either a recommendation or suggestion of field reordering is provided to a programmer to be used in redefining variables, or the program may automatically have variables redefined, and run to determine constraints. These constraints, and iterative program tests can then be done to dynamically improve the performance of the application.

While the invention has been described as of benefit to pointer based languages such as C, it will be recognized that other languages which provide the ability to independently access data elements will also benefit from the present invention. The size of the cache line compared to the size of the independently accessible elements will also affect the operation of the invention. If the cache line size is large compared to the element size, many pairs of high affinity elements may be combines such that they are likely to reside on the same cache line, resulting in the potential for great performance improvements, beyond those provided just by having a larger cache line. Cache lines typically run about 64 to 128 bytes in current personal computer systems. Other sizes, such as 16, 32, 128, 256 and larger are also contemplated. The lines need not be a power of two in further embodiments.

This application is intended to cover any adaptations or variations of the present invention. It is manifestly intended that this invention be limited only by the claims and equivalents thereof.

We claim:

1. A method of reordering data elements defined in a computer program, the method comprising:

identifying a weight between pairs of pairs of elements in a multi element data structure to form a weighted affinity graph;

identifying data elements which should be laid out together based on the weighted affinity graph; and providing a list of data elements which should be laid out together based on said identified data elements to cause them to be stored on the same cache line.

2. The method of claim 1 wherein data elements having a combined size greater than a predetermined amount are not laid out together.

3. The method of claim 1 wherein a greedy algorithm is used to identify the data elements which should be laid out together.

4. The method of claim 1 wherein further elements are laid out with pairs of elements based on a combined affinity to elements laid out together.

5. The method of claim 4 wherein such further elements are selected to maximize layout affinity.

6. The method of claim 4 wherein such further elements are selected to minimize layout affinity between different sets of elements laid out together.

7. The method of claim 1 wherein data elements are not combined based on selected constraints.

8. The method of claim 7 wherein the constraints are generated by at least one of program analysis, programmer generated and dynamic running of applications having reorganized data elements.

9. A computer readable medium having program instructions stored thereon which cause a computer to implement a method of reordering elements defined in a computer program, the method comprising:

identifying a weight between pairs of pairs of elements in a multi element data structure to form a weighted affinity graph;

identifying data elements which should be stored adjacently based on the weighted affinity graph; and providing documentation of a layout of data elements which improves cache utilization.

10. The computer readable medium of claim 9 wherein the instructions are written in a pointer based language having independently accessible data elements.

11. The computer readable medium of claim 9 wherein the weighted affinity graph comprises data elements as nodes of the graph, connections between nodes which are weighted with temporal access affinity values.

12. A tool for reordering data elements defined in a computer program written in a pointer based language, the method comprising:

means for identifying a weight between pairs of pairs of elements in a multi element data structure to form a weighted affinity graph;

means for identifying data elements which should be laid out together based on the weighted affinity graph; and means for providing a list of data elements which should be laid out together based on said identified data elements to cause them to be stored on the same cache line.

13. The tool of claim 12 wherein the pointer based language comprises C.

14. The tool of claim 12, and further comprising means for dynamically generating constraints on elements.

15. A method of dynamically reordering data elements defined in a computer program, the method comprising:

determining a recommended layout for data elements based on temporal access affinity;

modifying the layout of such data elements in accordance with the recommended layout;

running the computer program with the data elements defined in accordance with the recommended layout;

generating layout constraints based on the running of the computer program; and redetermining a recommended layout for data elements based on generated constraints.

16. The method of claim 15 wherein the temporal access affinity is represented by a weighted affinity graph.

17. The method of claim 16 wherein each data element is represented as a node in the graph, and the nodes are coupled by edges which are weighted according to likelihood of temporally related access.

18. The method of claim 15, wherein determining a recommended layout is also based on selected constraints.

19. A computer readable medium containing computer executable instructions for causing a computer to implement a method of dynamically reordering data elements defined in a computer program, the method comprising:

determining a recommended layout for data elements based on temporal access affinity;

modifying the layout of such data elements in accordance with the recommended layout;

running the computer program with the data elements defined in accordance with the recommended layout;

generating layout constraints based on the running of the computer program; and redetermining a recommended layout for data elements based on generated constraints.

20. A method of reordering data elements defined in a computer program, the method comprising:

identifying a weight between pairs of pairs of elements in a multi element data structure to form a weighted affinity graph;

identifying data elements which should be laid out together based on the weighted affinity graph; and providing a recommended layout of data elements which induce them to be stored on the same cache line;

modifying the layout of such data elements in accordance with the recommended layout;

running the computer program with the data elements defined in accordance with the recommended layout;

generating layout constraints based on the running of the computer program; and determining a new recommended layout for data elements based on the generated constraints.

21. The method of claim 20 and further comprising iteratively:

running the computer program with the data elements defined in accordance with the recommended layout;

generating layout constraints based on the running of the computer program; and determining a new recommended layout for data elements based on the generated constraints.

22. The method of claim 21 and further comprising generating a layout affinity for each layout.

* * * * *